(12) United States Patent
Woo (10) Patent No.: US 8,707,362 B2
(45) Date of Patent: Apr. 22, 2014

(54) DATA BROADCAST RECEIVER AND METHOD FOR GATHERING DATA BROADCASTING APPLICATION

(75) Inventor: Man-Shick Woo, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 12/744,378

(22) PCT Filed: Dec. 12, 2008

(86) PCT No.: PCT/KR2008/007395
§ 371 (c)(1), (2), (4) Date: May 24, 2010

(87) PCT Pub. No.: WO2009/078631
PCT Pub. Date: Jun. 25, 2009

(65) Prior Publication Data
US 2010/0257568 A1    Oct. 7, 2010

(30) Foreign Application Priority Data

Dec. 14, 2007 (KR) .................. 10-2007-0131085

(51) Int. Cl.
*H04N 7/173* (2011.01)
*H04N 21/482* (2011.01)
*H04N 5/445* (2011.01)
*G06F 3/048* (2013.01)

(52) U.S. Cl.
CPC ......... *H04N 21/482* (2013.01); *H04N 5/44543* (2013.01); *G06F 3/048* (2013.01)
USPC ................... 725/45; 725/52; 725/87

(58) Field of Classification Search
USPC ........................................ 725/87
See application file for complete search history.

(56) References Cited

U.S. PATENT DOCUMENTS

| 5,621,456 | A | * | 4/1997 | Florin et al. .................... 725/43 |
| 6,966,065 | B1 | * | 11/2005 | Kitazato et al. ............... 725/116 |
| 7,117,441 | B2 | * | 10/2006 | Allport ........................ 715/721 |
| 7,246,329 | B1 | * | 7/2007 | Miura et al. .................. 715/810 |
| 7,987,482 | B2 | * | 7/2011 | de Heer ......................... 725/44 |
| 2002/0128029 | A1 | * | 9/2002 | Nishikawa et al. ........... 455/517 |

(Continued)

FOREIGN PATENT DOCUMENTS

| CN | 1784005 A | 6/2006 |
| EP | 1 014 620 A1 | 6/2000 |

(Continued)

OTHER PUBLICATIONS

Chinese Office Action dated Aug. 15, 2011 issued in Application No. 200880120954.9 (English translation only).

(Continued)

*Primary Examiner* — Nasser Goodarzi
*Assistant Examiner* — Michael B Pierorazio
(74) *Attorney, Agent, or Firm* — KED & Associates, LLP (57) ABSTRACT

A data broadcast receiver includes a broadcast signal receiving unit receiving broadcast signals corresponding to a selected channel, a signal separating unit separating the broadcast signals received through the broadcast signal receiving unit into video signals, audio signals, and data signals, a data parsing unit parsing the data signals separated by the signal separating unit and extracting data carousel, and a middleware engine partially gathering the data carousel extracted by the data parsing unit according to a preset priority.

10 Claims, 4 Drawing Sheets

(56) References Cited

U.S. PATENT DOCUMENTS

| | | | |
|---|---|---|---|
| 2004/0055008 A1* | 3/2004 | Ikeda | 725/46 |
| 2006/0117370 A1* | 6/2006 | Kitazato et al. | 725/116 |
| 2007/0073900 A1* | 3/2007 | Park et al. | 709/246 |
| 2007/0112786 A1* | 5/2007 | Shin et al. | 707/10 |
| 2007/0130592 A1* | 6/2007 | Haeusel | 725/81 |
| 2007/0186240 A1* | 8/2007 | Ward et al. | 725/42 |
| 2007/0192800 A1* | 8/2007 | Walter et al. | 725/53 |
| 2007/0199037 A1* | 8/2007 | Matsuzaki et al. | 725/115 |
| 2007/0204293 A1* | 8/2007 | Hamada | 725/37 |
| 2007/0250793 A1* | 10/2007 | Miura et al. | 715/810 |
| 2007/0280232 A1* | 12/2007 | Dec et al. | 370/390 |
| 2007/0288965 A1* | 12/2007 | Murakami et al. | 725/46 |
| 2007/0294231 A1* | 12/2007 | Kaihotsu | 707/3 |
| 2008/0059521 A1* | 3/2008 | Hutson et al. | 707/104.1 |
| 2008/0062318 A1* | 3/2008 | Ellis et al. | 348/564 |
| 2008/0064490 A1* | 3/2008 | Ellis | 463/25 |
| 2008/0066111 A1* | 3/2008 | Ellis et al. | 725/57 |
| 2008/0086752 A1* | 4/2008 | Perez | 725/87 |
| 2008/0243924 A1* | 10/2008 | Barrett et al. | 707/104.1 |

FOREIGN PATENT DOCUMENTS

| | | |
|---|---|---|
| KR | 10-0557051 | 2/2006 |
| WO | WO 2006/024309 | 3/2006 |
| WO | WO 2006/065074 | 6/2006 |

OTHER PUBLICATIONS

International Search Report issued in PCT/KR2008/007395 dated Jul. 27, 2009.
European Search Report dated Aug. 26, 2011 issued in Application No. 08 86 1877.
ETSI TR 101 202 V1.2.1 (Jan. 2003); "Digital Video Broadcasting (DVB) Implementation Guidelines for Data Broadcasting;" European Broadcasting Union; Technical Report; ETSI Standards; Lis, Sophia Antipolis; Cedex, France; vol. BC, No. V1.2.1; Jan. 1, 2003 (XP 014004800).

* cited by examiner

DATA BROADCAST RECEIVER AND METHOD FOR GATHERING DATA BROADCASTING APPLICATION

TECHNICAL FIELD

The present disclosure relates to a data broadcast receiver receiving data broadcast, and more particularly, to a data broadcast receiver, which is capable of gathering (or combining) carousel data of data broadcast according to priority, and a method for gathering data broadcasting application.

BACKGROUND ART

Data broadcast providing interactive services using digital data enables the use of convergence service of broadcasting, communication and Internet, such as Video On Demand (VOD), banking, shopping mall, video phone, as well as the viewing of existing broadcast programs.

Data broadcast can provide a variety of services by transmitting various data and applications within broadcast stream, together with video and audio. Data broadcast may be categorized into standalone service and enhanced service according to types.

That is, the standalone service (e.g., today's headline news, weather forecast, stock quoting service, traffic information, e-commerce, etc.) provides on-air broadcast programs over channels which are independently operated. The enhanced service (e.g., or introduction of synopsis or cast in drama, introduction of players or game record in sports broadcasting, etc.) provides broadcast programs and their related data together.

In order for such data broadcast, middlewares are required to enable the download and execution of the application between the application and the data broadcast receiver.

Data broadcast middlewares are classified into Advanced Common Application Platform (ACAP) (terrestrial wave), Multimedia Home Platform (MHP) (satellite), and Open Cable Application Platform (OCAP) (cable), depending on broadcast media.

The middlewares are based on Globally Executable MHP (GEM) and may include an additional API according to characteristics of media. Java-based data broadcasting application that can be executed in the middlewares are called Xlet.

Meanwhile, the application in the digital broadcast is reconfigured into a message form (DSI/DII/DDB message) according to data/object carousel scheme of Digital Storage Media Control and Command (DSMCC) and transmits the reconfigured message.

A DSMCC parser mounted on the data broadcast receiver completes the application transmitted in the message form on a module basis, and generates data broadcasting application objects through parsing.

DISCLOSURE OF INVENTION

Technical Problem

Embodiments can reduce a load time taken until user interface (UI) for data broadcast is initially displayed.

Furthermore, embodiments can partially gather carousel data transmitted from the outside according to priority.

Moreover, embodiments can extract DSI corresponding to main UI of data broadcast and preferentially gather DII corresponding to the extracted DSI, thereby reducing time taken until the main UI of the data broadcast is displayed.

The technical problems are not limited to the aforesaid, but other technical problems not described herein will be clearly understood by those of ordinary skill in the art from the following description.

Technical Solution

In one embodiment, a data broadcast receiver includes: a broadcast signal receiving unit receiving broadcast signals corresponding to a selected channel; a signal separating unit separating the broadcast signals received through the broadcast signal receiving unit into video signals, audio signals, and data signals; a data parsing unit parsing the data signals separated by the signal separating unit and extracting data carousel; and a middleware engine partially gathering the data carousel extracted by the data parsing unit according to a preset priority.

In another embodiment, a method for gathering data broadcast application includes: receiving broadcast signals corresponding to a selected channel and separating the received broadcast signals into video signals, audio signals, and data signals; parsing the separated data signals and extracting data carousels; preferentially gathering data carousel corresponding to first priority according to a preset priority; and configuring and displaying a data broadcast screen based on the preferentially gathered data carousel.

In further another embodiment, a data broadcast receiver includes: a data parsing unit parsing data broadcast contained in a received broadcast signal and extracting data carousels; a middleware engine receiving DSI messages contained in the extracted data carousel extracted from the data parsing unit; and a graphic synthesis unit synthesizing data broadcast picture and video picture extracted from the middleware engine and displaying the synthesized picture, wherein the middleware engine selects a DSI message corresponding to a main menu from the received DSI messages, and preferentially gathers a DII message and a DDB message corresponding to the selected DSI message.

In still further another embodiment, a method for gathering data broadcast application includes: extracting a broadcast channel containing data broadcast from a received transport stream; storing data carousel for the extracted broadcast channel, and extracting DSI messages contained in the data carousel; selecting a specific DSI message for a main menu of a data broadcast screen among the extracted DSI messages; and preferentially gathering data carousel corresponding to the selected DSI message.

Advantageous Effects

According to the embodiment, since the data related to the main UI of the data broadcast are preferentially received, it is possible to solve inconvenience due to the loading time problem in the entering of the initial data broadcast.

Furthermore, according to the embodiment, since the data of the data broadcast are partially received according to the priority, it is possible to reduce time taken until the main UI of the data broadcast is displayed, and the user's satisfaction can be increased, thereby enhancing the efficiency of the data broadcast.

BEST MODE FOR CARRYING OUT THE INVENTION

Embodiments will be described below.

The following embodiments relate to an enhanced data broadcast service which transmits an application together with a video signal and an audio signal upon data broadcast. It will be understood that the spirit and scope of the invention is not limited to the following description.

In the following description, the meaning of "include" or "comprises" does not exclude other components or steps.

Figure 1:
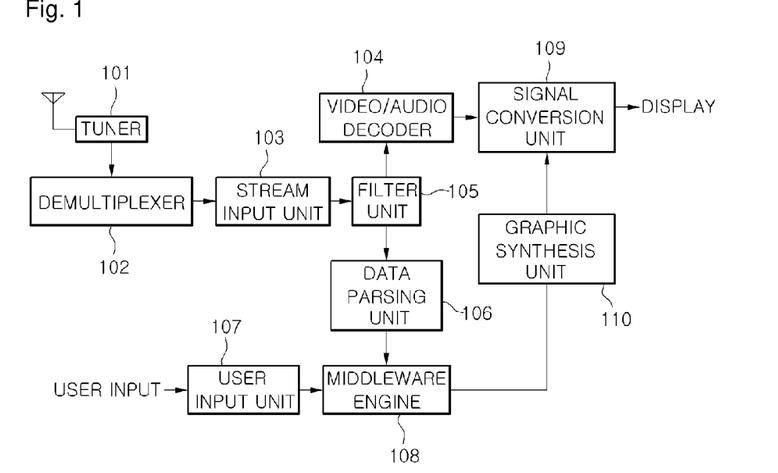
FIG. 1 illustrates the architecture of a data broadcast receiver according to an embodiment.

FIG. 1 illustrates the architecture of a data broadcast receiver according to an embodiment.

Referring to FIG. 1, the data broadcast receiver includes a tuner 101, a demultiplexer, a stream input unit 103, a filter unit 105, a video/audio decoder 104, and a signal conversion unit 109. The tuner 101 receives digital broadcast signals and selects a channel. The demultiplexer 102 demultiplexes broadcast signals received through the selected channel. The stream input unit 103 selectively receives streams. The filter unit 105 separates the demultiplexed transport streams into video/audio stream and data stream. The video/audio decoder 104 decodes the streams to extract video/audio data. The signal conversion unit 109 converts the decoded video/audio signals into signals suitable for a display device (not shown).

Although the tuner is exemplified as a broadcast signal receiver, it can also be replaced with other components in the case of cable TV or IP TV, depending on application products.

Furthermore, the data broadcast receiver includes a user input unit 107 receiving user's data broadcast display command, and the contents input through the user input unit 107 are transmitted to a middle engine 108.

The user input unit 107 is configured to receive a request command from the user and may be implemented with a key button or enter key for executing the displaying of the data broadcast.

Moreover, the user input unit 107 may be implemented with a touch screen module, a key input module, or a remote receiver module using wireless communications such as infrared communication.

The touch screen module may be provided in a display device (not shown), or may include function keys for setting various functions of TV with a built-in camera. The remote receiver module functions to transmit various button signals input through a remote controller to the middleware engine 108.

In addition, the data broadcast receiver includes a graphic synthesis unit 110, a data parsing unit 106, and a middleware engine 108. The graphic synthesis unit 110 synthesizes an application picture and a video picture and transmits the synthesized picture to the signal conversion unit 109. The data parsing unit 106 extracts program information and application data from the data stream received from the filter unit 105 and parses the extracted information and data. The middleware engine 108 manages initialization, execution and deletion of the downloaded application.

The data parsing unit 106 is configured to gather carousel data of the application partially transmitted by the middleware engine 108 according to subjects or UI structure. Therefore, the data parsing unit 106 preferentially transmits the DSI message of the carousel data to the middleware engine 108.

That is, the data carousel is generally divided into a download data message (DDM) and a download control message (MCM). The DCM indicates how data messages inside the module is configured and includes a DownloadServerinitiate (DSI) and DownloadInfoIndication (DII). Furthermore, the DDM contains ID, version, block number, and data and includes DownloadDataBlock (DDB).

The DSI contains serviceGateway information having root information of objects. Furthermore, the maximum size of the DSM-CC is 4 Kbytes. Therefore, the DII message is not enough to represent large carousel. Moreover, DSI is defined because the DII cannot represent more than one DII grouping information. Consequently, the DSI contains information on the uppermost root of all DII and DDB messages within a super group.

The middleware engine 108 requests, receives and parses the DSI message which can find out service gateway object information. The service gateway object refers to an object corresponding to the logically top level among various objects used in the data broadcasting application. As described above, the DSI message is a message containing information on the service gateway object.

The middleware engine 108 preferentially selects the first-priority DSI message according to the preset priority, and performs a gathering process of the DII message and the DDB message corresponding to the selected DSI message.

That is, the middleware engine 108 requests, to the data parsing unit 106, the DII corresponding to the main UI of the data broadcast UI for displaying the broadcast data to the user. The main UI is an OSD screen which initially displays data in order to indicate the entering of the data broadcast to the user.

The DII message is a message containing information on a specific module downloaded according to the data carousel scheme of the DSMCC, that is, module information such as size, version, and number of blocks (number of DDB blocks). That is, the number of modules necessary for making the module can be known from the DII. Furthermore, the modification of the contents of the module can be known from the version number, and the contents of the cache can be replaced.

Meanwhile, as described above, the middleware engine 108 may include an Advanced Common Application Platform (ACAP) engine.

The data parsing unit 106 performs a parsing operation according to TABLE ID such as Program Association Table (PAT), Program Map Table (PMT), System Time Stable (STT), Virtual Channel Table (VCT), Master Guide Test (MGT), Event Information Table (EIT), and Extended Text Table (ETT) which are contained in the received channel information, and transfers the data broadcast to the middleware engine 108.

Although not shown, the data broadcast receiver may further include a PSIP DB which stores database about the selected channel. Furthermore, the data broadcast receiver may further include a DII cache and a DDB cache connected to the data parsing unit 106. The DII cache stores the DII message of the carousel data, and the DDB cache stores the DBB message.

The middleware engine 108 preferentially gathers the DII message and the DDB message related to the corresponding DSI message when the main UI information of the data broadcast display is selected from the DSI message of the carousel data transmitted from the data parsing unit 106.

The DDB message is a message having actual data for making the module. The DDB message contains ID, version number, block number and data, and it is fixed to 4096 bytes except for the last module.

Consequently, if the data broadcast display command is input while the user views the broadcast program, the data parsing unit 106 transfers the DSI messages from the received carousel data to the middleware engine 108.

The middleware engine 108 selects the first-priority DSI message according to the preset priority, and preferentially gathers the carousel data corresponding to the selected DSI message.

That is, the middleware engine 108 preferentially parses the received DSI message and selects data to be displayed. If the gathering of the selected data is completed, the preferentially gathered data is displayed on a display screen.

The above operation will be described in more detail with reference to the drawings.

According to embodiments, when displaying the data broadcast to the user, the DII message and the DDB message contained in a specific DSI message are preferentially gathered by the middleware engine 204. When the user inputs the data broadcast request key, UI corresponding to the main menu of the data broadcast can be first displayed prior to the gathering process of all messages. Thus, the load time can be reduced.

Figure 2:
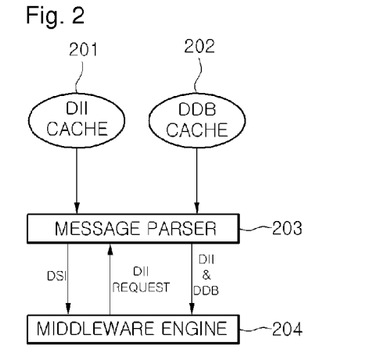
FIG. 2 illustrates a message transmission between a middleware engine and a data parsing unit according to an embodiment.

FIG. 2 illustrates a message transmission between the middleware engine and the data parsing unit according to an embodiment.

Referring to FIG. 2, a message parser 203 of the data parsing unit preferentially transmits the DSI message among the carousel data transmitted to the middle engine 204. The middleware engine 204 extracts, from the outgoing DSI message, data that can be first displayed to the user as the main menu.

In other words, the middleware engine 204 selects the first-priority data from the incoming DSI message, and requests the message parser 203 to transmit the DII message corresponding to the selected DSI message.

To this end, the message parser 203 manages the DII cache 201 storing the DII message of the received carousel data, and the DBB cache 202 storing the DDB message.

Consequently, the middleware engine 204 does not gather all messages contained in the received carousel data according to the DSI message, but preferentially gathers the DII message and the DDB message corresponding to the first-priority or selected DSI message.

Figure 3:
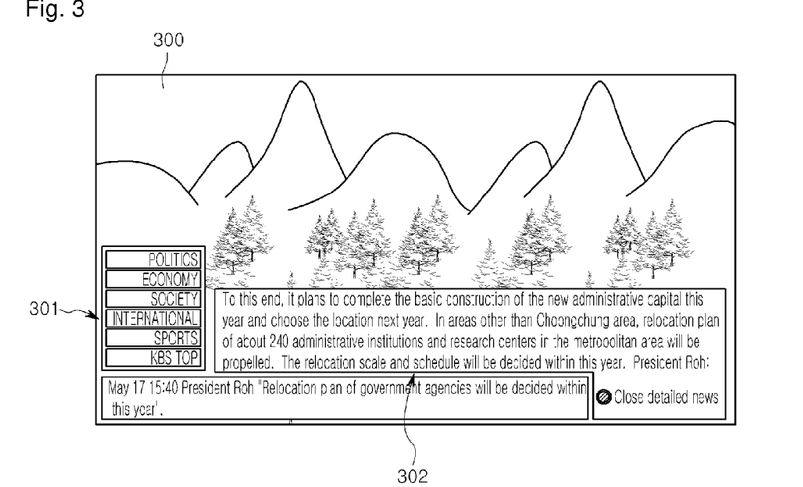
FIG. 3 illustrates the displaying of data broadcast.

The above-described process will be described with reference to FIG. 3.

If the command of requesting the data broadcast display is input while the user views a specific broadcast program screen 300, a main menu 301 for displaying the received data broadcast is preferentially displayed.

Then, the user selects a specific submenu while viewing the data broadcast main menu 301 displayed via OSD on the broadcast program screen 300. That is, the user can know brief contents of the data broadcast provided through the corresponding channel.

Regarding those procedures, the middleware engine 204 partially gathers the carousel data according to the user's request information.

That is, as described above, when the displaying of the data broadcast is requested, the DSI message corresponding to the UI of the main menu is extracted so that the UI corresponding to the data broadcast main menu can be first displayed on the OSD.

The DII message and the DDB message corresponding to the extracted DSI message are gathered so that the data broadcast main menu is preferentially displayed. When the gathering process of the carousel data corresponding to the main menu is completed, the gathering process of the corresponding carousel data is performed on detailed subjects.

Figure 4:
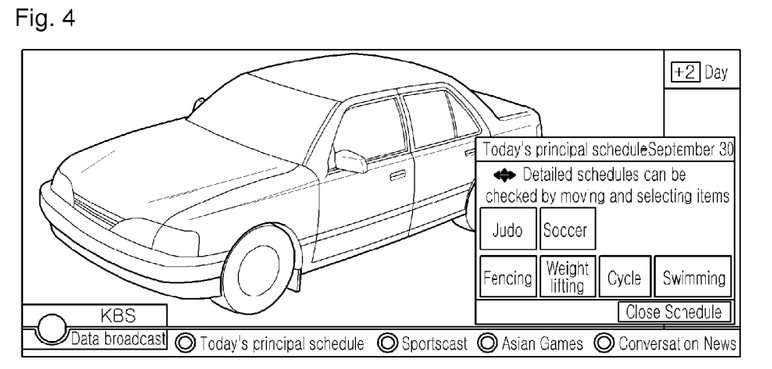
FIG. 4 illustrates the displaying of data broadcast corresponding to a specific selected menu.

That is, as illustrated in FIG. 4, the detailed subjects of the data broadcast provided through the current channel includes "politics", "economy", "society", "international", "sports" and "KBS TOP".

Accordingly, when the user selects the menu for a specific subject, the information corresponding to the selected menu is extracted from the DSI message that is provided from the data parsing unit.

The DII message corresponding to the extracted DSI message is parsed, and actual data is extracted from the DDB message and then displayed. In FIG. 3, a reference numeral 302 represents the UI displayed according to the selection of the detailed menu.

The detailed data may be actually gathered the time when the user selects the menu for the specific detailed subject, or the data for the specific detailed data may be sequentially gathered according to the preset priority.

That is, the middleware engine 204 selects the second-priority data from the received DSI messages, and requests the message parser 203 to transmit the DII message corresponding to the selected DSI message.

The priority of data to be gathered after the main menu may be set by the user or may be set randomly through the middleware engine 204.

In the following description, it is assumed that the subject set as the second priority is "politics", the subject set as the third priority is "economy", the subject set as the fourth priority is "society", the subject set as the fifth priority is "international", the subject set as the sixth priority is "sports", and the subject set as the seventh priority is "KBS TOP".

That is, the middleware engine 204 selects the data corresponding to "politics" from the received DSI messages, and requests the message parser 203 to transmit the DII message corresponding to the selected DSI message.

When the gathering of the carousel data corresponding to "politics", the gathering process is sequentially performed on the carousel data corresponding to the next priority.

When a selection signal for a specific subject is input by the user while the gathering process of the carousel data for the detailed subject is in process, the middleware engine 204 determines whether the gathering of the carousel data for the selected specific subject is completed.

When it is determined that the gathering process of the carousel data for the selected specific subject is completed, the middleware engine 204 enables the UI for the selected subject to be displayed on the display screen, as illustrated in FIG. 4.

Figure 5:
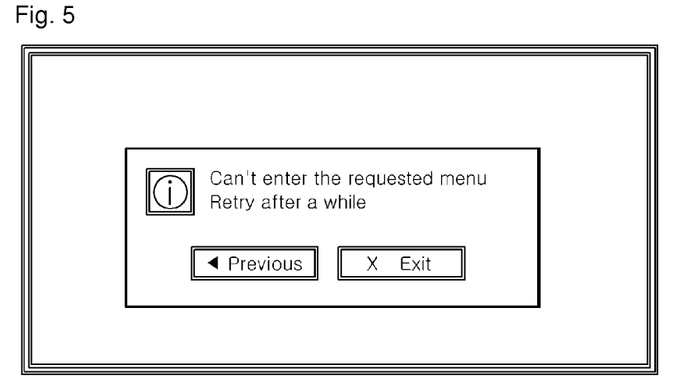
FIG. 5 illustrates an error message indicating that the displaying of data broadcast corresponding to a specific selected menu is not permitted.

Furthermore, when it is determined that the gathering process of the carousel data for the selected specific subject is not completed, the middleware engine 204 displays an error message indicating that the UI for the selected subject cannot be displayed, as illustrated in FIG. 5.

The middleware engine 204 most preferably gathers the carousel data for the specific subject selected by the user at the present time.

According to the embodiment, since the data related to the main UI of the data broadcast are preferentially received, it is possible to solve inconvenience due to the loading time problem in the entering of the initial data broadcast.

Furthermore, according to the embodiment, since the data of the data broadcast are partially received according to the priority, it is possible to reduce time taken until the main UI of the data broadcast is displayed, and the user's satisfaction can be increased, thereby enhancing the efficiency of the data broadcast.

Figure 6:
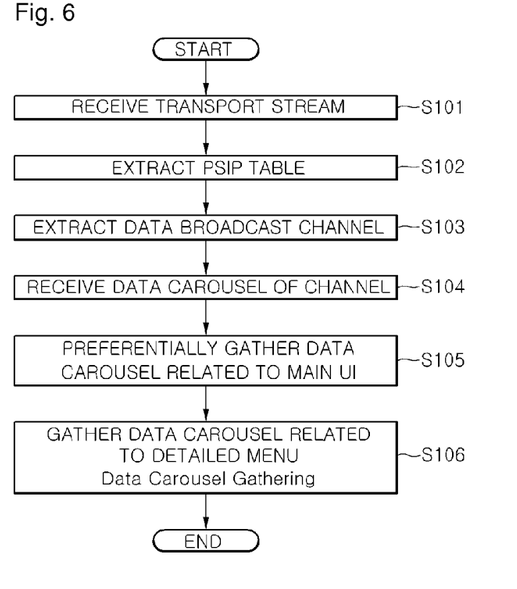
FIG. 6 is a flowchart illustrating a method for gathering data broadcasting application according to an embodiment.

FIG. 6 is a flowchart illustrating a method for gathering data broadcasting application according to an embodiment.

Referring to FIG. 6, the data broadcast receiver receives a transport stream (S101), and extracts PAT/PMT or PSIP table from the received transport stream (S102).

The data broadcast receiver can extract audio, video and data PID of virtual channels within one physical channel using the PSIP table or the like. When the data PID of the channel exists, the virtual channel is a channel containing the data broadcast. When the data PID does not exist, the virtual channel is a channel containing only A/V broadcast. Although not described above, such a structure is apparent to those of ordinary skill in the art, and thus its detailed description will be omitted.

The data broadcast receiver receives DSMCC data carousel table with respect to the broadcast channel containing the extracted data broadcast (S104), and extracts DSI/DII table of each broadcast channel.

The data broadcast receiver can receive all of DSI, DII, and DDB tables with respect to the broadcast channel currently viewed by the user among the broadcast channels containing the data broadcast.

When the data broadcast display is requested by the user, the data carousel according to the first-priority main menu (first UI) to be displayed as the UI on the screen is preferentially gathered (S105). That is, when displaying the data broadcast contents, the middleware engine preferentially gathers the data to be displayed to the user as the main UI so that the user can first view it.

Then, the related data carousel is gathered so that the contents (second UI) corresponding to the detailed menus can be displayed (S106). The gathering method of the data carousel related to the detailed menus can be classified into two types, which will be described later in detail.

After gathering all the received data carousels, they are not displayed to the user as UI, but the data carousels are sequentially gathered according to the order of the UI displayed to the user or the entering of the menu selected by the user, thereby reducing the initial load time.

Figure 7:
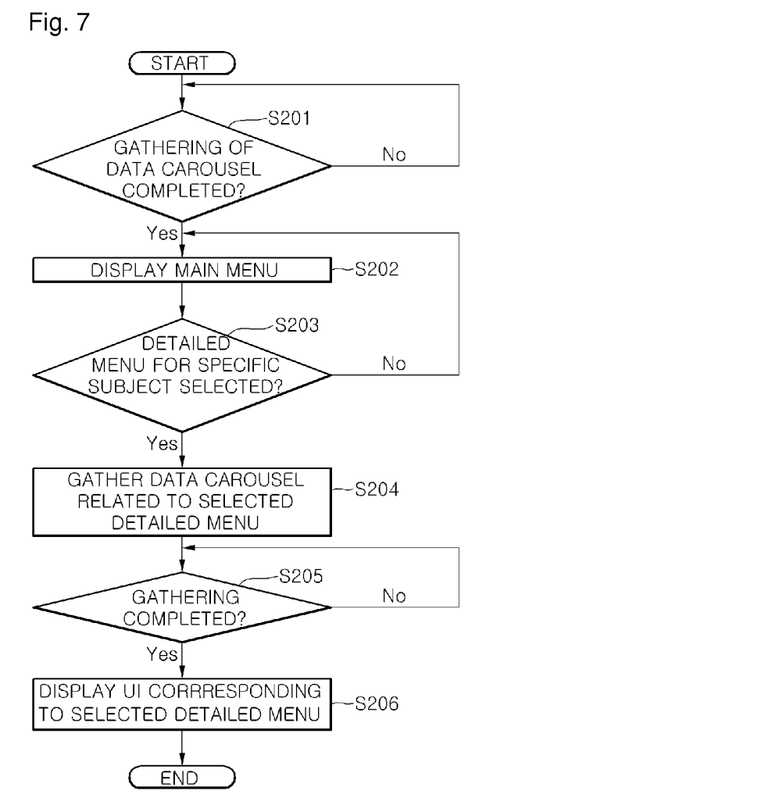
FIG. 7 is a flowchart illustrating a method for gathering data broadcasting application according to a first embodiment.

FIG. 7 is a flowchart illustrating a method for gathering data broadcasting application according to a first embodiment.

Referring to FIG. 7, it is determined whether the gathering process of the data carousel related to the first-priority main UI is completed (S201).

When it is determined that the gathering process of the data carousel related to the main UI is completed, the main UI, which is the initial picture of the data broadcast screen, is displayed (S202).

Then, it is determined whether the selection command of the detailed menu for the specific subject is input on the displayed menu screen (S203).

When it is determined that the selection command of the detailed menu for the specific subject is input, the data carousel related to the detailed menu to which the selection command is input is preferentially gathered (S204).

Thereafter, it is determined whether the gathering process of the data carousel related to the detailed menu to which the selection command is input is completed (S205).

When it is determined that the gathering process of the data carousel related to the detailed menu is completed, the UI (second UI) corresponding to the selected detailed menu is displayed (S206). That is, according to the first embodiment, the gathering process is performed on the data carousel required in entering the detailed menu according to the detailed menu entering command input by the user.

Figure 8:
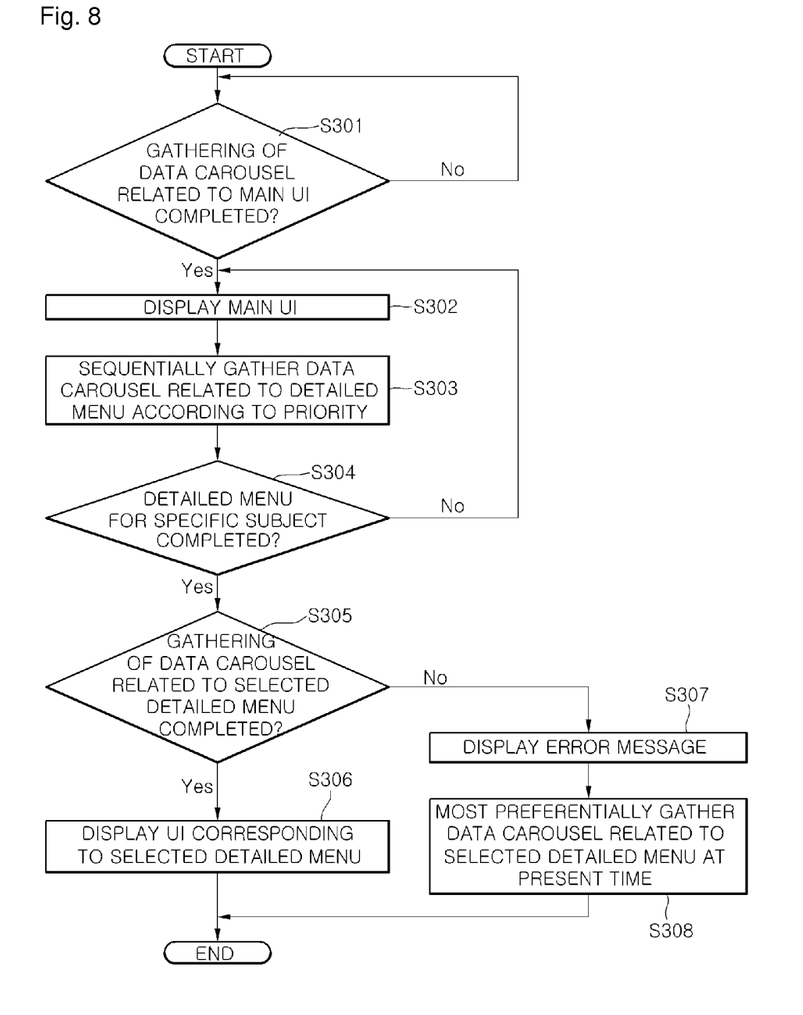
FIG. 8 is a flowchart illustrating a method for gathering data broadcasting application according to a second embodiment.

FIG. 8 is a flowchart illustrating a method for gathering data broadcasting application according to a second embodiment.

Referring to FIG. 8, it is determined whether the gathering process of the data carousel related to the first-priority main UI is completed (S301).

When it is determined that the gathering process of the data carousel related to the main UI is completed, the main UI, which is the initial picture of the data broadcast screen, is displayed (S302).

Then, the data carousels related to the detailed menu are sequentially gathered according to the priority (S303). That is, the data carousels related to the detailed menu are sequentially gathered according to the priority set by the user or the randomly set priority.

Then, it is determined whether the selection command of the detailed menu for the specific subject is input by the user (S304).

When it is determined that the selection command of the detailed menu for the specific subject is input, it is determined whether the gathering process of the data carousel related to the selected detailed menu is completed (S305).

When it is determined that the gathering process of the data carousel related to the selected detailed menu is completed, the UI corresponding to the selected detailed menu is displayed (S306).

Also, when it is determined that the gathering process of the data carousel related to the selected detailed menu is not completed, an error message indicating that the UI corresponding to the detailed menu cannot be displayed is displayed (S307).

The data carousel related to the selected detailed menu where the gathering process is not completed at the present time is gathered most preferentially (S308).

According to the embodiment, since the data related to the main UI of the data broadcast are preferentially received, it is possible to solve inconvenience due to the loading time problem in the entering of the initial data broadcast.

Furthermore, according to the embodiment, since the data of the data broadcast are partially received according to the priority, it is possible to reduce time taken until the main UI of the data broadcast is displayed, and the user's satisfaction can be increased, thereby enhancing the efficiency of the data broadcast.

INDUSTRIAL APPLICABILITY

The present invention has the industrial applicability because it can be applied to the display device providing the data broadcast.

The invention claimed is:
1. A data broadcast receiver, comprising:
a broadcast signal receiver that receives a broadcast signal corresponding to a selected channel;

a signal separator that separates the broadcast signal received through the broadcast signal receiver into video signals, audio signals, and data signals;

a data parser that parses the data signals separated by the signal separator and that extracts data carousel based on a preset priority;

a middleware engine that gathers one or more messages corresponding to a user interface (UI) from the extracted data carousel, wherein the UI includes an on-screen display (OSD) screen corresponding to a menu being displayed for entering a data broadcast and a specific detailed data corresponding to a main menu generated based on a user selection of the menu or the preset priority, and wherein the specific detailed data corresponding to the menu is displayed before all of the one or more messages contained in the data broadcast are gathered by the middleware engine, so that a user can select one of a plurality of selectable subjects while viewing the menu displayed through the OSD screen;

a graphic synthesizer that configures the UI using the one or more messages when gathering of the one or more messages corresponding to the main menu is completed; and a user input device that receives a data broadcast display command, wherein the menu displays information indicative of the plurality of selectable subjects corresponding to the data broadcast of the selected channel, wherein the middleware engine selectively outputs at least one of the data carousels corresponding to a specific subject of the plurality of selectable subjects selected on the displayed menu of the OSD screen by the user input device, and wherein when the gathering of the data carousels corresponding to the selected specific subject of the plurality of selectable subjects is not completed, the middleware engine gathers the data carousels corresponding to the specific subject of the plurality of selectable subjects at a current time.

2. The data broadcast receiver according to claim 1, wherein the middleware engine extracts a DSI message corresponding to the UI, and gathers a DII message and a DDB message corresponding to the extracted DSI message.

3. The data broadcast receiver according to claim 1, wherein the information indicative of the plurality of selectable subjects corresponds to different subject matter categories of information corresponding to the broadcast signal received through the selected channel.

4. The data broadcast receiver according to claim 2, wherein the graphic synthesizer configures the menu being displayed upon entering of the data broadcast corresponding to the broadcast signal by using the gathered DII message and DDB message.

5. The data broadcast receiver according to claim 2, wherein when the gathering of the DII message and the DDB message corresponding to the menu is completed, the middleware engine extracts DSI messages based on the plurality of selectable subjects of the data broadcast, and gathers data carousels corresponding to the plurality of selectable subjects in an extracting order of the DSI messages.

6. A method for receiving data broadcast application, the method comprising:

receiving a broadcast signal corresponding to a selected channel;

separating the received broadcast signal into video signals, audio signals, and data signals;

parsing the separated data signals and extracting data carousels;

receiving a message corresponding to a main menu from the extracted data carousels;

configuring the main menu based on the message when the gathering of the message corresponding to the main menu is completed;

displaying the main menu configured based on the message, the main menu being displayed for selecting one of detailed menus contained in a data broadcast;

selectively outputting at least one of the data carousels corresponding to a specific detailed menu of the plurality of selectable detailed menus selected on the displayed main menu; and when the gathering of the data carousels corresponding to the selected specific detailed menu of the plurality of selectable detailed menus is not completed, gathering the data carousels corresponding to the specific detailed menu of the plurality of selectable detailed menus at a current time, wherein the main menu includes an OSD (on-screen display) screen being displayed upon entering the data broadcast, and wherein the main menu comprises information indicative corresponding to the detailed menus contained in the data broadcast.

7. The method according to claim 6, wherein the gathering of the message corresponding to the main menu comprises:

extracting a DSI message for the main menu displayed after receiving the data signals corresponding to the broadcast signal of the selected channel; and gathering a DII message and a DDB message corresponding to the extracted DSI message.

8. The method according to claim 7, further comprising:

extracting DSI messages based on the detailed menus when the message gathering corresponding to the main menu is completed; and sequentially gathering data carousels corresponding to the DSI messages based on the detailed menus.

9. The method according to claim 8, further comprising:

displaying an error message when information corresponding to a selected one of the detailed menus is not available.

10. The data method according to claim 6, wherein the information indicative corresponds to different subject matter categories of information corresponding to the broadcast signal received through the selected channel.

* * * * *